(12) United States Patent
Tokuyama

(10) Patent No.: US 9,013,583 B2
(45) Date of Patent: *Apr. 21, 2015

(54) IMAGE PICKUP APPARATUS AND REPRODUCTION CONTROL APPARATUS

(75) Inventor: Haruto Tokuyama, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/365,727

(22) Filed: Feb. 3, 2012

(65) Prior Publication Data

US 2012/0133791 A1 May 31, 2012

Related U.S. Application Data

(63) Continuation of application No. 12/312,111, filed as application No. PCT/JP2007/070745 on Oct. 24, 2007, now Pat. No. 8,154,606.

(30) Foreign Application Priority Data

Oct. 24, 2006 (JP) ................................ P2006-288626

(51) Int. Cl.
*H04N 5/228* (2006.01)
*H04N 5/232* (2006.01)
*G07F 17/32* (2006.01)
(Continued)

(52) U.S. Cl.
CPC ................ *H04N 5/232* (2013.01); *G07F 17/32* (2013.01); *G07F 17/3211* (2013.01); *G07F 17/3213* (2013.01); *H04N 5/23241* (2013.01); *H04N 5/23245* (2013.01); *H04N 5/235* (2013.01); *H04N 5/772* (2013.01); *H04N 5/775* (2013.01); *H04N 9/7921* (2013.01); *H04N 9/8063* (2013.01); *H04N 9/8205* (2013.01)

(58) Field of Classification Search
None
See application file for complete search history.

(56) References Cited

U.S. PATENT DOCUMENTS

| | | | |
|---|---|---|---|
| 5,239,418 A | 8/1993 | Tyler et al. | |
| 5,455,561 A | 10/1995 | Brown | |

(Continued)

FOREIGN PATENT DOCUMENTS

| | | | |
|---|---|---|---|
| JP | 63-059074 A | 3/1988 | |
| JP | 11-015425 A | 1/1999 | |

(Continued)

OTHER PUBLICATIONS

Supplementary European Search Report, EP 07830479, dated Mar. 24, 2010.

(Continued)

*Primary Examiner* — Jason Flohre
(74) *Attorney, Agent, or Firm* — Lerner, David, Littenberg, Krumholz & Mentlik, LLP

(57) ABSTRACT

Image pickup means is capable of picking up an image at a first frame rate and a second frame rate that is higher than the first frame rate. A highlight scene is detected by detection means. When detecting the highlight scene, image pickup operation is performed at a high speed mode and an image signal at high frame rate (240 fps) is produced for a period of predetermined time. When detecting no highlight scene, image pickup operation is performed at a normal mode and an image signal at normal frame rate (60 fps) is produced. It is possible to save time and labor for performing a switchover operation of a frame rate when imaging a highlight scene. It is also possible to save power consumption and a capacity of a storage medium.

8 Claims, 14 Drawing Sheets

(51) Int. Cl.
*H04N 5/235* (2006.01)
*H04N 5/77* (2006.01)
*H04N 9/79* (2006.01)
*H04N 5/775* (2006.01)
*H04N 9/806* (2006.01)
*H04N 9/82* (2006.01)

(56) References Cited

U.S. PATENT DOCUMENTS

| | | | |
|---|---|---|---|
| 6,072,525 A * | 6/2000 | Kaneda | 348/208.15 |
| 7,742,690 B2 | 6/2010 | Tabuchi et al. | |
| 2001/0022619 A1* | 9/2001 | Nishiwaki | 348/208 |
| 2001/0043270 A1 | 11/2001 | Lourie et al. | |
| 2002/0003576 A1* | 1/2002 | Konishi et al. | 348/220 |
| 2003/0035051 A1* | 2/2003 | Cho et al. | 348/169 |
| 2003/0086692 A1 | 5/2003 | Hori et al. | |
| 2003/0128282 A1 | 7/2003 | Sudo | |
| 2003/0215010 A1 | 11/2003 | Kashiwa | |
| 2004/0136689 A1 | 7/2004 | Oka | |
| 2004/0190886 A1 | 9/2004 | Tomita | |
| 2005/0195304 A1 | 9/2005 | Nitta et al. | |
| 2006/0083502 A1 | 4/2006 | Higo | |
| 2006/0104609 A1 | 5/2006 | Ohmori et al. | |
| 2006/0132622 A1 | 6/2006 | Ikeyama et al. | |
| 2006/0238620 A1 | 10/2006 | Asada et al. | |
| 2007/0172217 A1 | 7/2007 | Toji | |
| 2008/0129854 A1 | 6/2008 | Onoda et al. | |

FOREIGN PATENT DOCUMENTS

| | | |
|---|---|---|
| JP | 11-177868 A | 7/1999 |
| JP | 2000-059698 A | 2/2000 |
| JP | 2001-036848 A | 2/2001 |
| JP | 2001-292409 A | 10/2001 |
| JP | 2001-358984 A | 12/2001 |
| JP | 2002-320198 A | 10/2002 |
| JP | 2004-120384 A | 4/2004 |
| JP | 2004-187018 A | 7/2004 |
| JP | 2004328218 A | 11/2004 |
| JP | 2005-278135 A | 10/2005 |
| JP | 2006033160 A | 2/2006 |
| JP | 2006265475 A | 10/2006 |

OTHER PUBLICATIONS

Office Action from Japanese Application No. 2011-255231, dated Nov. 6, 2012.

Office Action from Korean Application No. 10-2009-7007784, dated Sep. 28, 2013.

* cited by examiner

FIG. 4
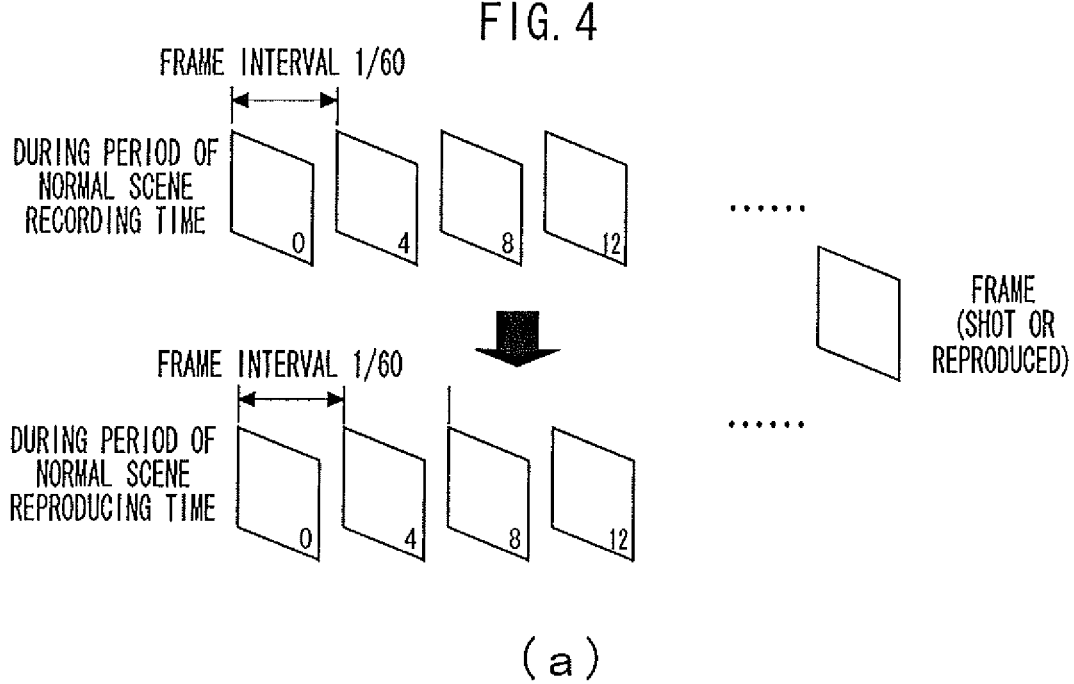
(a)
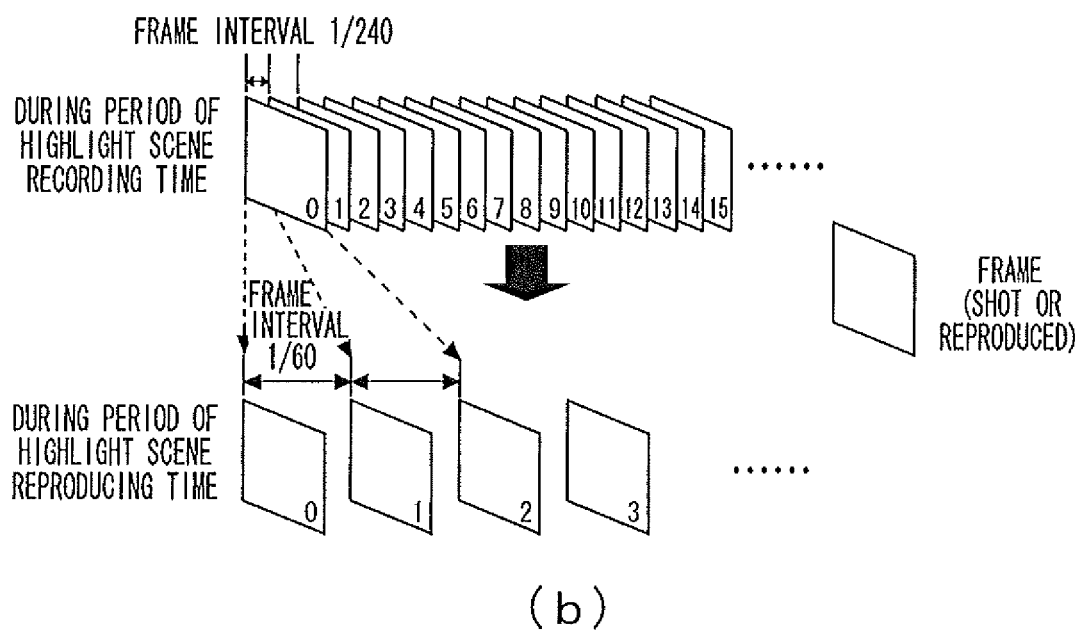
(b)

FIG. 5
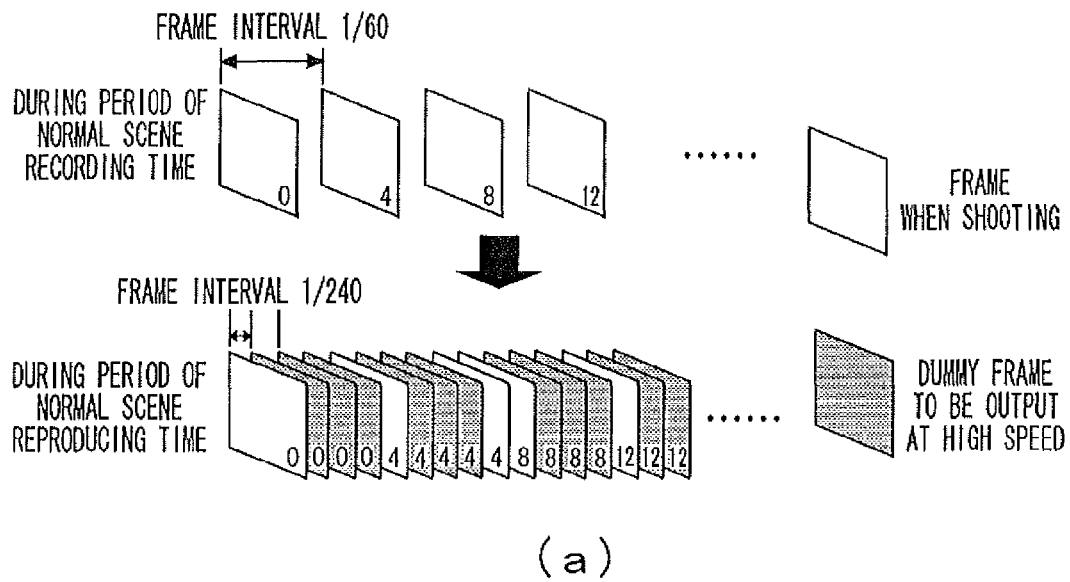
(a)
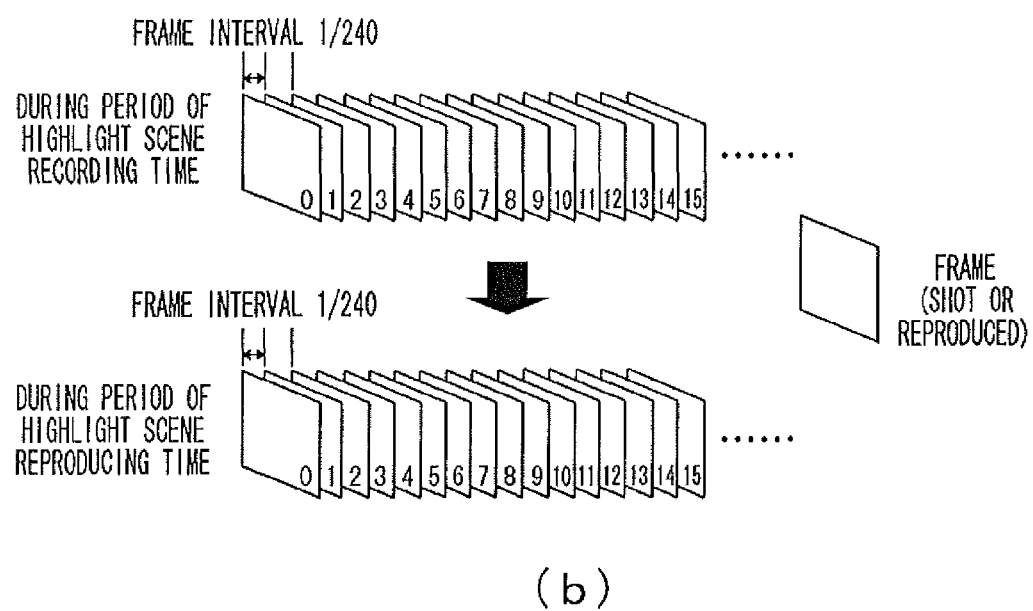
(b)

FIG. 11
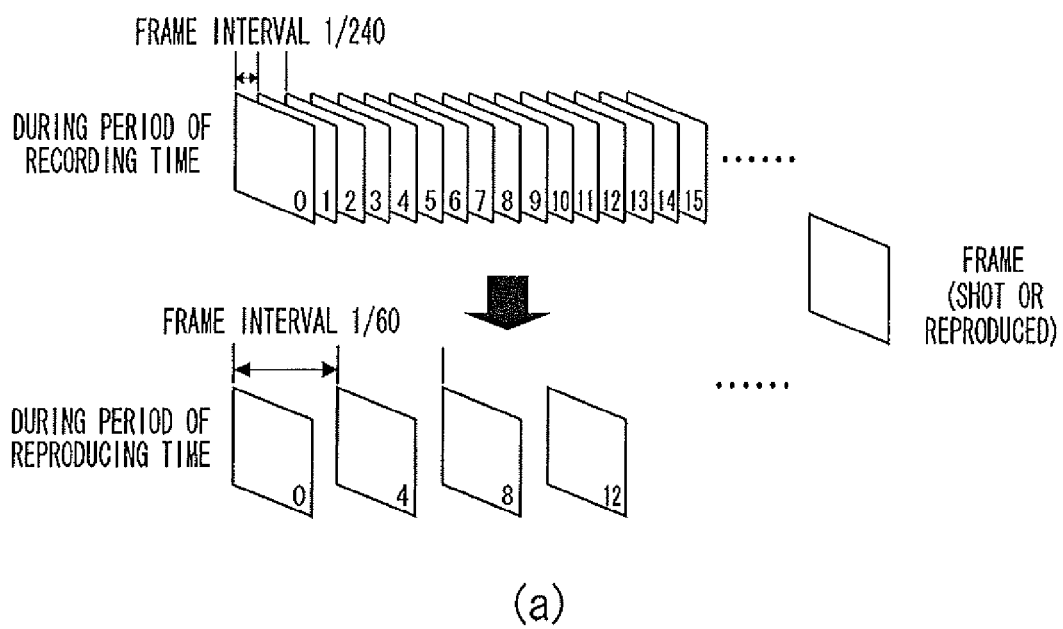
(a)
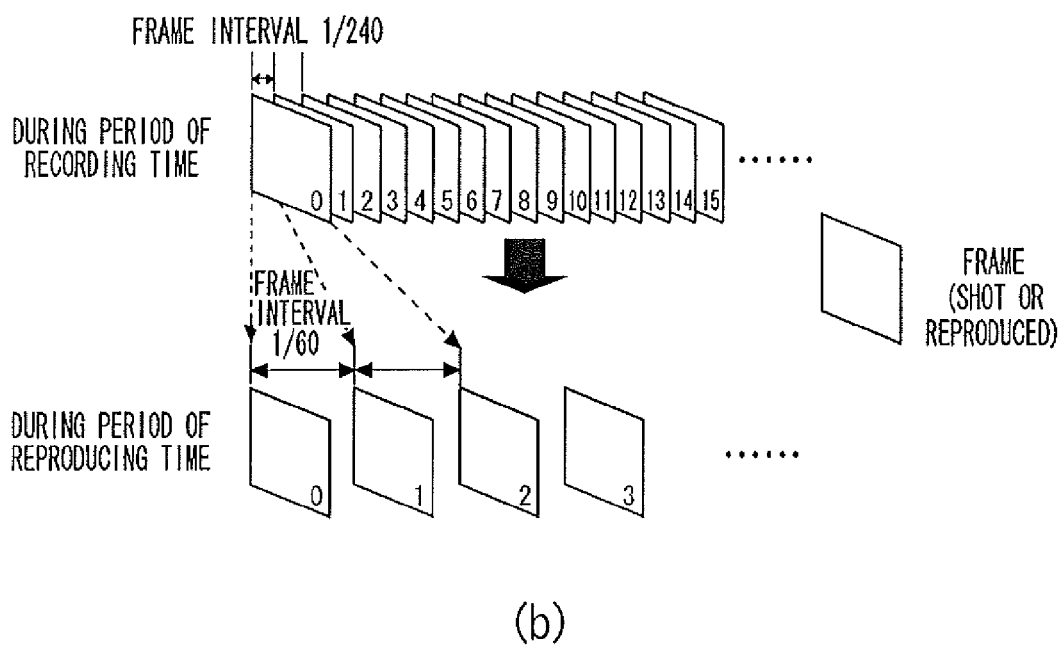
(b)

IMAGE PICKUP APPARATUS AND REPRODUCTION CONTROL APPARATUS

CROSS-REFERENCE TO RELATED APPLICATIONS

This application is a continuation of U.S. application Ser. No. 12/312,111, filed Apr. 23, 2009, which is a national phase entry under 35 U.S.C. §371 of International Application No. PCT/JP2007/070745, filed Oct. 24, 2007, which claims priority from Japanese Application No.: JP2006-288626, filed Oct. 24, 2006, all of which are incorporated herein by reference.

TECHNICAL FIELD

The present invention relates to an image pickup apparatus that is capable of picking up an image while switching over a frame rate and a reproduction control apparatus that is capable of reproducing moving image information at a frame rate to which an external monitor device corresponds.

BACKGROUND ART

Based on a recent change of trend in an image pickup device from a charge coupled device (CCD) to a complementary metal oxide semiconductor (CMOS) and technology to realize a high resolution of an image pickup device or an image pickup system based on compatibility with Hi-Vision in broadcasting, an image pickup environment at a high speed frame rate is realized even in a commercially available image pickup apparatus by restricting a resolution thereof.

For example, Japanese Patent Application Publication No. S63-59074 discloses a high-speed video camera that is capable of picking up an image at a high speed by making a shutter speed and a frame speed variable. Furthermore, Japanese Patent Application Publication No. 2001-292409 discloses that, as a recording and reproducing apparatus for reproducing an image obtained in an image pickup environment at a high speed frame rate, high-quality slow-motion recording and normal recording can be switched.

DISCLOSURE OF THE INVENTION

Problems to be Solved by the Invention

Meanwhile, in the conventional image pickup apparatus, there have been problems such that since a user picks up an image at a high speed by his manual designation of the shutter speed and the frame speed, operation is complicated and means for switching over a frame rate during a period of reproducing time is required.

Furthermore, in the conventional recording and reproducing apparatus, there have been problems such that it cannot adjust a frame rate of output images according to corresponding situations such as whether or not a display of a destination of reproduced output corresponds to a high frame rate and it cannot adjust a frame rate when the display of the destination of reproduced output displays the output images.

Means for Solving the Problems

Accordingly, in order to enable time and labor for switching over a frame rate when imaging a highlight scene to be saved and to enable power consumption and a capacity of a storage medium to be saved, an image pickup apparatus of the invention is provided with image pickup means which is capable of picking up an image at a first frame rate and a second frame rate that is higher than the first frame rate, detection means for detecting a highlight scene, and control means for switching over a frame rate of the image pickup means in response to detection of the highlight scene by the detection means.

Further, in order to enable a frame rate of output image to be adjusted depending on whether or not a destination of reproduced output corresponds to a high frame rate and to enable to be adjusted a frame rate when the destination of reproduced output displays the image, a reproduction control apparatus of the invention is a reproduction control apparatus for reproducing moving image information and auxiliary information on the moving image information from a recording medium, the apparatus being provided with determination means for determining which a reproducing mode when reproducing the moving image information is a thinning-out reproducing mode or a non-thinning-out reproducing mode based on a frame rate to which an external monitor device corresponds and the auxiliary information, and control means for controlling a reproducing operation of the moving image information according to a determination result of the determination means.

Effects of the Invention

According to the image pickup apparatus of the present invention, switchover of a frame rate is carried out in response to the detection of the highlight scene, for example, it is automatically switched from the first frame rate to a second frame rate higher than the first frame rate. Accordingly, it is possible to save time and labor for performing a frame rate switchover operation when the highlight scene is picked up. Moreover, it is switched to the second frame rate when the highlight scene is detected, so that power consumption and a capacity of a storage medium can be saved as compared with an instance of fixing to the second frame rate.

Furthermore, according to the reproduction control apparatus of the present invention, a reproducing mode when reproducing the moving image information is determined to be either a thinning-out reproducing mode or a non-thinning-out reproducing mode based on the frame rate to which the external monitor device corresponds and the auxiliary information that is reproduced together with the moving image information to be reproduced so that the reproduction operation control of the moving image information is performed according to a determination result. For example, if it is determined that a frame rate of the moving image information is higher than a frame rate to which the external monitor device corresponds, then it is determined to be the thinning-out reproducing mode and the moving image information is reproduced at the frame rate to which the external monitor device corresponds. Due to this, it is possible to output the moving image information at a frame rate of an output image according to corresponding situations such as whether or not a display of the destination of the reproduced output corresponds to a high speed frame rate.

BRIEF DESCRIPTION OF THE DRAWINGS

FIG. 4 are diagrams for explaining operations during a period of recording time and a period of reproducing time in the image pickup apparatus (for an instance in which an external monitor device does not correspond to a high speed frame rate).

FIG. 5 are diagrams for explaining operations during a period of recording time and a period of reproducing time in the image pickup apparatus (for an instance in which the external monitor device corresponds to the high speed frame rate).

FIG. 11 are diagram for explaining reproducing operations when an external monitor device that does not correspond to the high speed frame rate is connected.

BEST MODE FOR CARRYING OUT THE INVENTION

Figure 1:
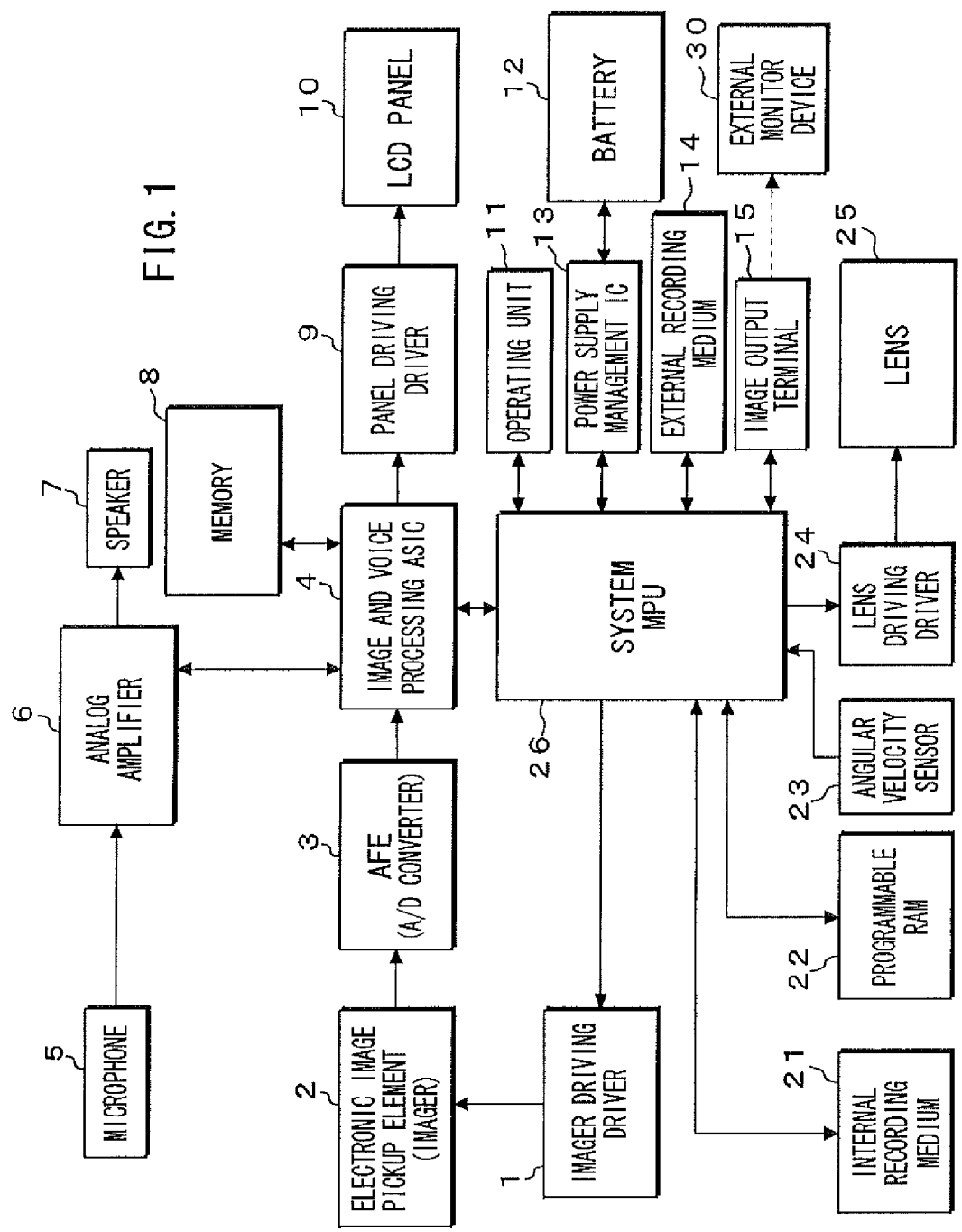
FIG. 1 is a block diagram showing a configuration of an image pickup apparatus according to the present invention.

Next, embodiments of the present invention will be described with reference to the drawings. FIG. 1 is a block diagram showing a configuration of an image pickup apparatus according to the present invention. The image pickup apparatus according to the present invention is intended to pay attention to the fact that in a transition period in which an external monitor device used by being connected to the image pickup apparatus is made the transition to an external monitor device that corresponds to not only a first frame rate but also a second frame rate that is a frame rate higher than the first frame rate, the external monitor device that corresponds to the second frame rate and the external monitor device that does not correspond to it are present in a mixed fashion and to an influence on power during image pickup operation and on a capacity of a recording medium. In the following description, it is assumed that the first frame rate is a frame rate of standard television system, for example, 60 fps (frames per second) or 50 fps (it is to be noted that one field of "odd fields" and "even fields" according to NTSC, PAL, SECAM and the like is described herein as "one frame"). It is also assumed that the second frame rate is, for example, 240 fps (frames per second) which is four times as high as the first frame rate. It is to be noted that the first frame rate is referred to as "normal frame rate" and that the second frame rate is referred to as "high speed frame rate".

The image pickup apparatus according to the present invention is provided with an imager driving driver 1, an electronic image pickup element (imager) 2, an analog front end (AFE) 3, an image and voice processing ASIC (Application Specific Integrated Circuit) 4, a microphone 5, an analog amplifier 6, a speaker 7, a memory 8, a panel driving driver 9, an LCD (Liquid Crystal Display) panel 10, an operating unit 11, a battery 12, a power supply management IC 13, an external recording medium 14, an image output terminal 15, an internal recording medium 21, a programmable RAM (Random Access Memory) 22, an angular velocity sensor 23, a lens driving driver 24, a lens 25 and a system MPU (Micro Processing Unit) 26.

The imager driving driver 1 is a circuit for driving the electronic image pickup element 2. The electronic image pickup element 2 is an image pickup element that is capable of generating not only image signals at the normal frame rate but also image signals at the high speed frame rate. For example, a CMOS (Complementary Metal Oxide Semiconductor) imager or the like is employed as the electronic image pickup element 2.

The AFE 3 is provided with an analog signal processing circuit, an A/D converter and the like. The AFE 3 performs signal processings on an analog image signal generated by the electronic image pickup element 2, for example, a noise reduction processing, a signal level adjustment processing or the like. Furthermore, it converts the image signal that has been subjected to the signal processing into a digital image signal.

The image and voice processing ASIC 4 is an application specific integrated circuit processing an image signal and a voice signal. The image and voice processing ASIC 4 performs processings such as a color processing and a lens correction processing on, for example, the digital image signal obtained by the AFE 3. It also performs a compression processing, an expansion processing and the like on the image signal.

The microphone 5 detects a voice, converts it into an electric signal to be outputted. The analog amplifier 6 is a circuit that amplifies the electric signal output from the microphone 5. The speaker 7 converts the electric signal amplified by the analog amplifier 6 into a voice to be outputted. The memory 8 is a circuit that stores therein various types of data. The panel driving driver 9 is a circuit that drives respective pixels of the LCD panel 10 based on the image signal processed by the image and voice processing ASIC 4. The operating unit 11 is provided with various kinds of operation switches. The battery 12 generates power to be supplied to respective constituent elements of this image pickup apparatus. The power supply management IC 13 is a circuit that detects a state of the battery 12 and a load state and that manages a power supply of this image pickup apparatus.

The external recording medium 14 is an external recording medium for storing therein moving image information, voice image information and the like generated by this image pickup apparatus. The image output terminal 15 is an output terminal for supplying the moving image information generated by this image pickup apparatus or the moving image information recorded in the external recording medium 14 to the external monitor device 30 so that the images can be monitored. The internal recording medium 21 is a storage device included in this image pickup apparatus and stores therein the moving image information, the voice information and the like generated by this image pickup apparatus.

The programmable RAM 22 constitutes various types of logics that are necessary for this image pickup apparatus.

The angular velocity sensor 23 is a sensor for realizing a hand shake prevention function of this image pickup apparatus and detects an angular velocity when the image pickup apparatus moves.

The lens driving driver 24 is a circuit that drives the lens 25 based on a lens driving signal and performs a zooming operation or the like.

The system MPU 26 is a micro processing unit that controls the respective constituent elements of this image pickup apparatus.

Operation will next be described. The system MPU 26 transmits a driving pulse corresponding to the high speed frame rate to the imager driving driver 1 to drive the electronic image pickup element 2 in a high speed mode when an operation mode of the image pickup apparatus is set to an operation mode for generating image signals at a high speed frame rate (hereinafter, referred to as "high speed mode").

Further, the system MPU 26 also causes the AFE 3 and the image and voice processing ASIC 4 to perform signal processings in the high speed mode to generate image signals at the high speed frame rate. Moreover, the system MPU 26 causes the image and voice processing ASIC 4 to perform a compression processing on the image signals at the high speed frame rate. The system MPU 26 performs a processing for outputting the image signals at the high speed frame rate thus obtained by controlling the operations performed by the respective constituent elements from the image output terminal 15 and a processing for recording the image recording data obtained by compression-processing the image signals at the high speed frame rate into the external recording medium 14 (or into the internal recording medium 21). When recording the image recording data, the voice input from the microphone 5 is digitally sampled, compressed and recorded synchronously with the picked-up images at the high speed frame rate. It is to be noted that the image signals at the high speed frame rate may be recorded into the external recording medium 14 (or into the internal recording medium 21). By thus selecting the high speed mode as the operation mode, it is possible to output or record picked-up images at a high temporal resolution.

If the operation mode of the image pickup apparatus is set to an operation mode for generating image signals at the normal frame rate (hereinafter, referred to as "normal mode"), the system MPU 26 lowers a frequency of the driving pulse itself to reduce power consumption of the image pickup apparatus as compared with that of the high speed mode, and drives the electronic image pickup element 2, the AFE 3, the image and voice processing ASIC 4 and the like in the normal mode.

In the normal mode, a resolution in a temporal direction is reduced as compared with that of the high speed mode, but it has merits of smaller influence or the like on the power consumption and on a capacity of each of the recording mediums since the frame rate of the image images is reduced. It is to be noted that exposure time differs between the high speed mode and the normal mode so that a signal level may be set equal between the cases even if the exposure time differs by causing the image and voice processing ASIC 4 or the like to make a gain adjustment of the image signals.

If the external monitor device 30 can correspond to the high speed frame rate, it is possible to display the picked-up images using the image signals output from the image output terminal 15 of the image pickup apparatus. On the other hand, if the external monitor device 30 does not correspond to the high speed frame rate, for example, if it is an LCD panel or the like included in a conventional television apparatus or equipment, it is impossible to display the picked-up images when the frame rate of the image signals output from the image output terminal 15 of the image pickup apparatus is the high speed frame rate.

Therefore, for the external device that does not correspond to the high speed frame rate, as an application of a high speed frame rate imaging function which the image pickup apparatus includes, a slow reproducing mode for outputting at the normal frame rate the image signals at the high speed frame rate obtained by picking up the images in the high speed mode is provided. For example, a slow reproducing mode is provided for reproducing 240 frame images per second (240 fps) at a rate of 60 frame images per second (60 fps), thereby outputting the image signals for fourfold time. By doing so, slow reproduced images at a high temporal resolution can be displayed using the image signals at the high speed frame rate.

In this way, even if the external monitor device that does not correspond to the high speed frame rate is employed, the picked-up images can be displayed by providing the slow reproducing mode and therefore even all images can be picked up at the high speed frame rate. However, if all the images are picked up at the high frame rate, the power consumption of the image pickup apparatus increases as stated above, resulting in reduction in operable time of the image pickup apparatus. Furthermore, if a resolution in the high speed mode is set identical to a resolution in the normal mode, recordable time is also reduced because of the large number of frames per unit of time.

Therefore, the image pickup apparatus according to the present invention detects a highlight scene based on information obtained by the image pickup apparatus during picking up the image and automatically switches over the frame rate of picked-up images in response to detection of the highlight scene. By thus switching over the frame rate, it is possible to automatically produce an effect of generating slow-motion images of the highlight scene while saving time and labor required for the frame rate switchover operation and saving the power consumption and the capacity of the medium.

It is to be noted that the system MPU 26 realizes detection of the highlight scene and the frame rate switchover.

Figure 2:
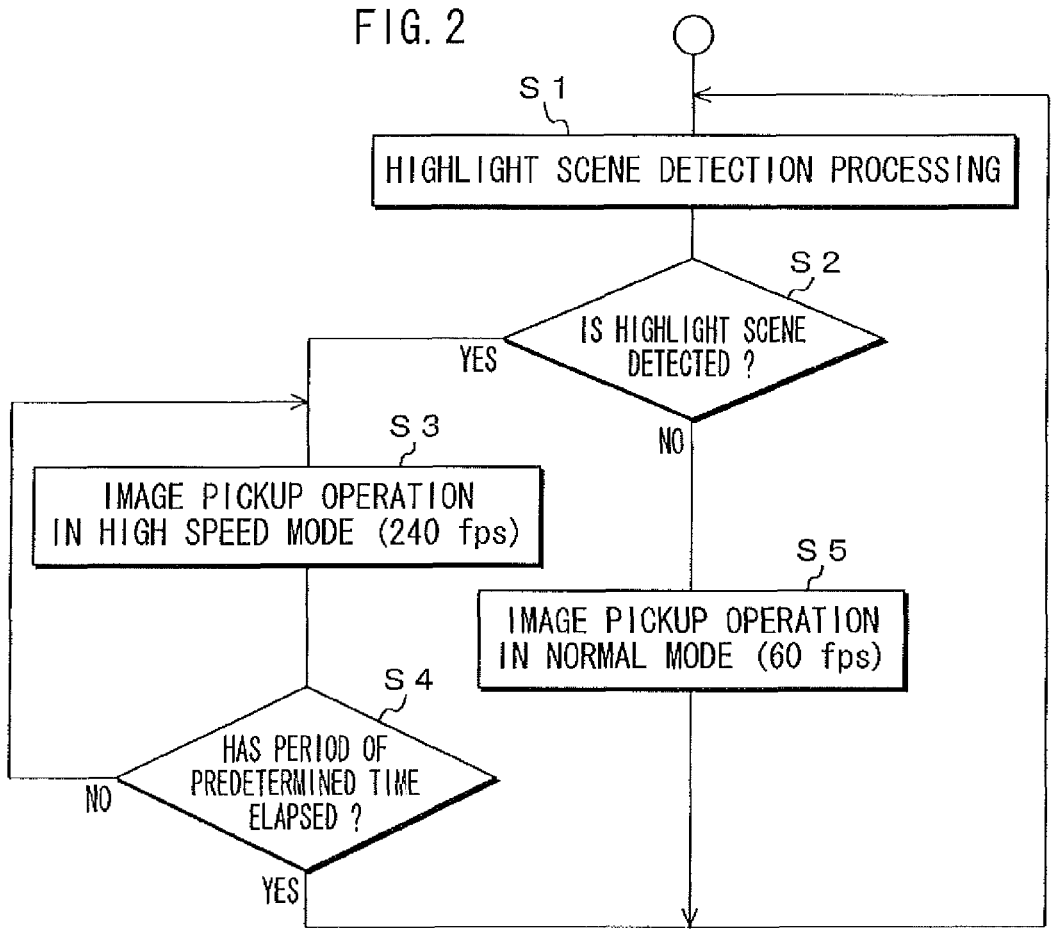
FIG. 2 is a flowchart showing a frame rate switchover operation in the image pickup apparatus.

FIG. 2 is a flowchart showing a frame rate switchover operation performed by the image pickup apparatus. As shown in the flowchart of FIG. 2, the system MPU 26 performs a highlight scene detection processing (step S1). Next, the system MPU 26 determines whether or not a highlight scene is detected (step S2) and, if the highlight scene is detected, the system MPU 26 sets the operation mode to the high speed mode to cause an image pickup operation at a frame rate of 240 fps and to generate image signals (step S3). Thereafter, the system MPU 26 determines whether or not a period of predetermined time has elapsed since the image signals are generated in the high speed mode (step S4). If the period of predetermined time has not elapsed, generation of image signals in the high speed mode is continued. If the period of predetermined time has elapsed, the highlight scene detection processing is done. Further, if the highlight scene is not detected, the system MPU 26 sets the operation mode to the normal mode to cause an image pickup operation at a frame rate of 60 fps and to generate the image signals (step S5).

The highlight scene detection processing will next be described. Detection of the highlight scene indicates excess of a moving amount of a subject over a predetermined value. The system MPU 26 detects the highlight scene using image signals of picked-up images. For example, the image and voice processing ASIC 4 calculates an inter-frame difference and supplies an obtained calculation result to the system MPU 26. The system MPU 26 compares the calculation result with a preset threshold value and if the calculation result exceeds the threshold value, determines that the moving amount of the subject exceeds the predetermined value and that the highlight scene is detected. If the calculation result does not exceed the threshold value, it determines that the moving amount of the subject does not exceed a predetermined amount and that the highlight scene is not detected.

Meanwhile, if the image pickup apparatus is fixed and there is no change in an imaging range, the calculation result of calculation of the inter-frame difference is a value indicating the moving amount of the subject. However, the zooming operation for changing the imaging range is performed (for example, a zooming-in or zooming-out operation is performed) or an imaging direction is changed (for example, if a pan-tilt operation is performed or if a hand shake is great), the calculation result of the calculation of the inter-frame difference may possibly become a large value even if the subject does not move.

Therefore, if the system MPU 26 detects the highlight scene using an output from a zooming operation situation and/or hand shake correction sensor (the angular velocity sensor 23 herein), it is possible to enhance the accuracy of the highlight scene detection.

Figure 3:
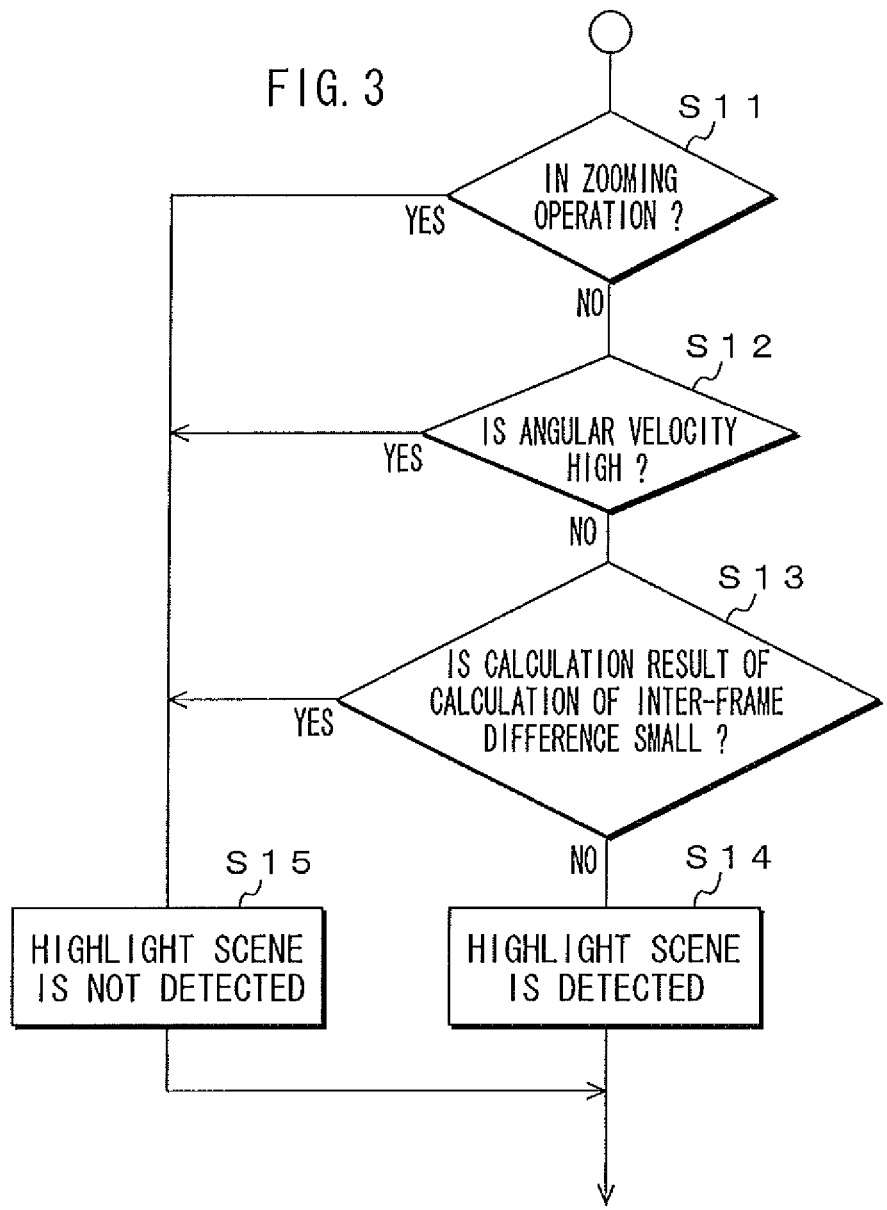
FIG. 3 is a flowchart showing a highlight scene detection processing.

FIG. 3 is a flowchart showing the highlight scene detection processing. The highlight scene detection processing shown in FIG. 3 shows an instance of highly accurately detecting the highlight scene using not only the result of the calculation of the inter-frame difference but also a zooming operation situation and the output from the angular velocity sensor 23.

According to the flowchart shown in FIG. 3, the system MPU 26 first determines whether or not the lens driving driver 24 is performing a zooming operation (step S11). If it is in a zooming operation, the system MPU 26 determines that no highlight scene is detected (step S15).

If it is determined that the lens driving driver 24 is not in a zooming operation, the system MPU 26 next determines whether or not an angular velocity added to this image pickup apparatus is high based on the output from the angular velocity sensor 23 by, for example, comparison with a preset threshold value (step S12). As a result thereof, if a magnitude of the angular velocity detected by the angular velocity sensor 23 is higher than the threshold value, the system MPU 26 determines that no highlight scene is detected (step S15).

If it determines that the angular velocity is not higher than the threshold value in the step S12, the system MPU 26 next determines whether or not the calculation result of the calculation of the inter-frame difference is small by, for example, comparison with a preset threshold value (step S13). As a result thereof, if the calculation result is smaller than the threshold value, the system MPU 26 determines that no highlight is detected (step S15).

Further, if the calculation result is not smaller than the threshold value in the step S13, the system MPU 26 determines that the highlight scene is detected (step S14).

Moreover, the system MPU 26 may detect the highlight scene using not only the image signals of the picked-up images but also the voice signal from the microphone or the like. For example, if a signal level of the voice signal from the microphone is higher than a threshold value, it determines that a highlight scene is detected so that by generating image signals in the high speed mode for a period of predetermined time, it is possible to record, for example, a start scene in a race scene at an athletic meeting or the like as a highlight scene at the high frame rate.

Moreover, by setting a high speed frame rate flag according to an ordinary operation button, for example, by turning on the flag with long depression of a recording start release button used as a trigger, the operation mode can be switched over from the normal mode to the high speed mode while continuing the image pickup operation.

FIG. 4 show operations during a period of recording time and a period of reproducing time in the image pickup apparatus and show an instance in which the external monitor device 30 does not correspond to the high speed frame rate.

FIG. 4(*a*) shows the operations during a period of recording time and a period of reproducing time if the external monitor device 30 connected to the image output terminal 15 does not correspond to the high speed frame rate and the highlight scene is not detected. That is, since no highlight scene is detected, frames generated by the image pickup apparatus and given frame numbers [0, 4, 8, 12 . . . ] are recorded at intervals of 1/60 second during the period of recording time. Furthermore, since the external monitor device 30 does not correspond to the high speed frame rate and the frames are recorded at intervals of 1/60 second, frames of given frame numbers [0, 4, 8, 12 . . . ] are reproduced at intervals of 1/60 second during the period of reproducing time.

FIG. 4(*b*) shows the operations during a period of recording time and a period of reproducing time if the external monitor device 30 connected to the image output terminal 15 does not correspond to the high speed frame rate and the highlight scene is detected. That is, if the highlight scene is detected, the operation mode is set to the high speed mode for a period of predetermined time. Accordingly, frames generated by the image pickup apparatus and given frame numbers [0, 1, 2, 3, 4, 5, 6, 7, 8 . . . ] are recorded at intervals of 1/240 second during the period of recording time. Furthermore, since the external monitor device 30 does not correspond to the high speed frame rate, frames of given frame numbers [0, 1, 2, 3, 4, 5, 6, 7, 8 . . . ] are reproduced at intervals of 1/60 second during the period of reproducing time.

Moreover, in the image pickup apparatus according to the present invention, as a usage intended to the external monitor that corresponds to the high speed frame rate, a high frame rate reproducing mode of outputting image signals at the high speed frame rate is provided. In this high frame rate reproducing mode, if image signals to be output are image signals generated in the high speed mode, they are output as they are without changing the frame rate. If the image signals to be output are image signals generated in the normal mode, they are converted into image signals at the high speed frame rate by repeating output of frame images so as to be output.

It is to be noted that the mode of outputting the image signals as shown in FIG. 4 will be referred to as "normal frame rate reproducing mode". Specifically, in the normal frame rate reproducing mode, if image signals to be output are image signals generated in the normal mode, they are output as they are without changing the frame rate. If the image signals to be output are image signals generated in the high speed mode, these image signals are output at the normal mode frame rate.

FIG. 5 show operations during a period of recording time and a period of reproducing time in the image pickup apparatus and show an instance in which the external monitor device 30 corresponds to the high speed frame rate.

FIG. 5(*a*) shows the operations during a period of recording time and a period of reproducing time if the external monitor device 30 connected to the image output terminal 15 corresponds to the high speed frame rate and the highlight scene is not detected. Specifically, since no highlight scene is detected, frames that are generated by the image pickup apparatus and that are of given frame numbers [0, 4, 8, 12 . . . ] are recorded at intervals of 1/60 second during the period of recording time. Furthermore, since the external monitor device 30 corresponds to the high speed frame rate and the frames are reproduced at intervals of 1/240 second, outputs of the respective frame images (outputting dummy frames) are repeated during the period of reproducing time to increase the number of frames fourfold and frames of given frame numbers [0, 0, 0, 0, 4, 4, 4, 4, 8 . . . ] are reproduced at intervals of 1/240 second.

FIG. 5(*b*) shows the operations during a period of recording time and a period of reproducing time if the external monitor device 30 corresponds to the high speed frame rate and the highlight scene is detected. Specifically, if the highlight scene is detected, the operation mode is set to the high speed mode for a period of predetermined time. Accordingly, frames that are generated by the image pickup apparatus and that are of given frame numbers [0, 1, 2, 3, 4, 5, 6, 7, 8 . . . ] are recorded at intervals of 1/240 second during the period of recording time. Furthermore, since the external monitor device 30 corresponds to the high speed frame rate, as frames during the period of reproducing time, recorded frames of given frame numbers [0, 1, 2, 3, 4, 5, 6, 7, 8 . . . ] are reproduced at intervals of 1/240 second.

It is to be noted that the mode of outputting the image signals as shown in FIG. 5 will be referred to as "high speed frame rate reproducing mode". Specifically, in the high speed frame rate reproducing mode, if image signals to be output are image signals generated in the high speed mode, they are output as they are without changing the frame rate. If the image signals to be output are image signals generated in the normal mode, then frame interpolation is performed, so that they are converted into images signals at the high speed frame rate so as to be output.

In this way, in the high speed frame rate reproducing mode, the image signals generated in the high speed mode are output without changing the frame rate. It is, therefore, possible to display images at a high temporal resolution for a period of predetermined time since the highlight scene is detected. Further, in the normal frame rate reproducing mode, the image signals generated in the high speed mode are output at the normal mode frame rate. It is, therefore, possible to reproduce the images in slow motion by as much as the period of predetermined time since the highlight scene is detected.

Next, an instance of switching over the high speed frame rate reproducing mode to/from the normal frame rate reproducing mode depending on whether or not the external monitor device 30 corresponds to the high speed frame rate.

Figure 6:
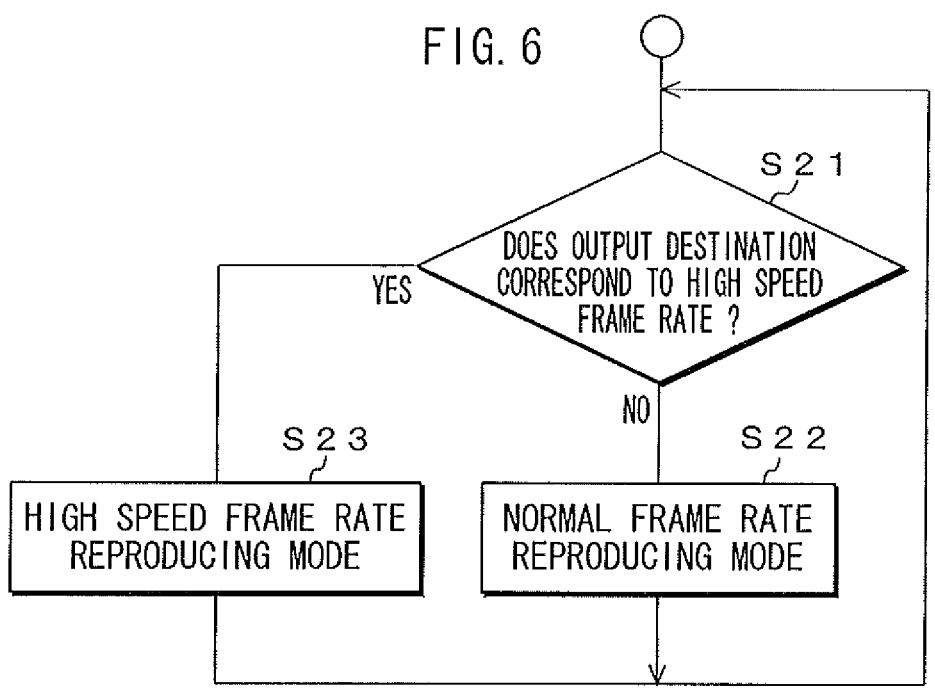
FIG. 6 is a flowchart showing a switchover operation between a high speed frame rate reproducing mode and a normal frame rate reproducing mode.

FIG. 6 is a flowchart showing a switchover operation between the high speed frame rate reproducing mode and the normal frame rate reproducing mode. The system MPU 26 first determines whether or not the external monitor device 30 serving as an output destination to which image signals are output corresponds to the high speed frame rate (step S21). This determination is made based on, for example, a signal from the operating unit 11. Specifically, a user determines whether or not the external monitor device 30 serving as the output destination corresponds to the high speed frame rate and then manipulates the operating unit 11 based on a determination result. The system MPU 26 determines whether or not a user's manipulation based on the determination result as to whether or not it corresponds to the high speed frame rate is performed based on the signal from the operating unit 11, and determines whether or not the external monitor device 30 serving as the output destination corresponds to the high speed frame rate based on this user's manipulation. As a result of this determination, if it is determined in the step S21 that the external monitor device 30 serving as the output destination corresponds to the high speed frame rate, the process shifts to the high frame rate reproducing mode (step S23). On the other hand, if it is determined in the step S21 that it does not correspond to the high speed frame rate, the normal frame rate reproducing mode is set (step S22).

In this way, if the frame rate is switched over in response to detection of the highlight scene and the image signals are generated, it is possible to realize reduction of power consumption and suppression of an amount of data stored in each recording medium. Furthermore, by switching over the frame rate of image signals to be output depending on whether or not the external monitor device 30 corresponds to the high speed frame rate, it is possible to display images at the high temporal resolution or display images in slow motion for a period of predetermined time since detection of the highlight scene.

Whether or not the external monitor device 30 can correspond to high speed can be determined by user's setting or determined electrically or by a control signal during cable connection. For example, if the external monitor device 30 corresponds to HDMI (High Definition Multimedia Interface), the determination can be made based on display specifications of the external monitor device acquired through the HDMI.

Figure 7:
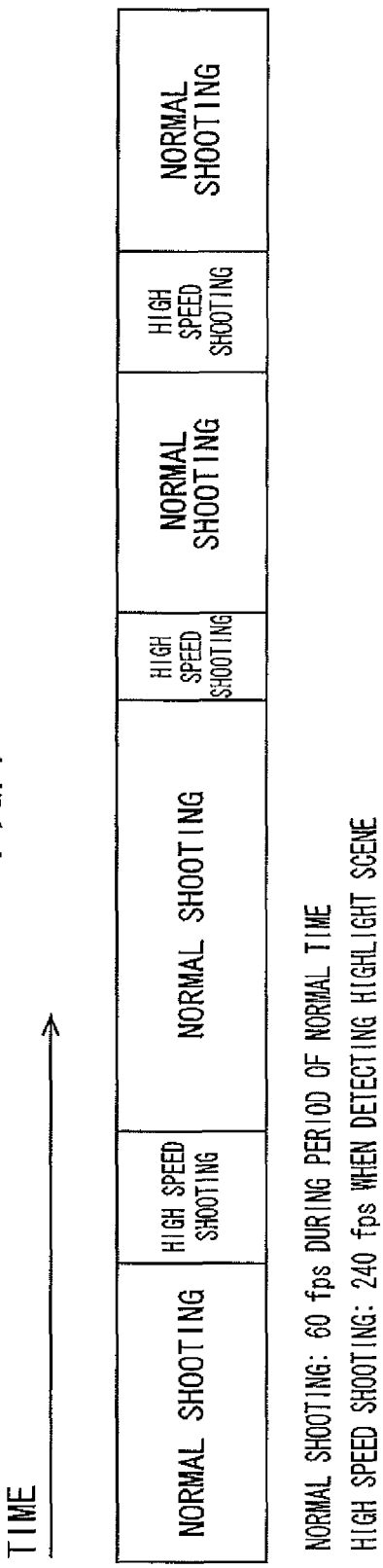
FIG. 7 is an explanatory diagram showing a structure of a moving image file.

FIG. 7 shows a structure of a moving image file recorded while image signals obtained by performing an image pickup operation in the normal mode (by normal shooting) and image signals obtained by performing the image pickup operation in the high speed mode (by high speed shooting) are present in a mixed fashion.

Figure 8:
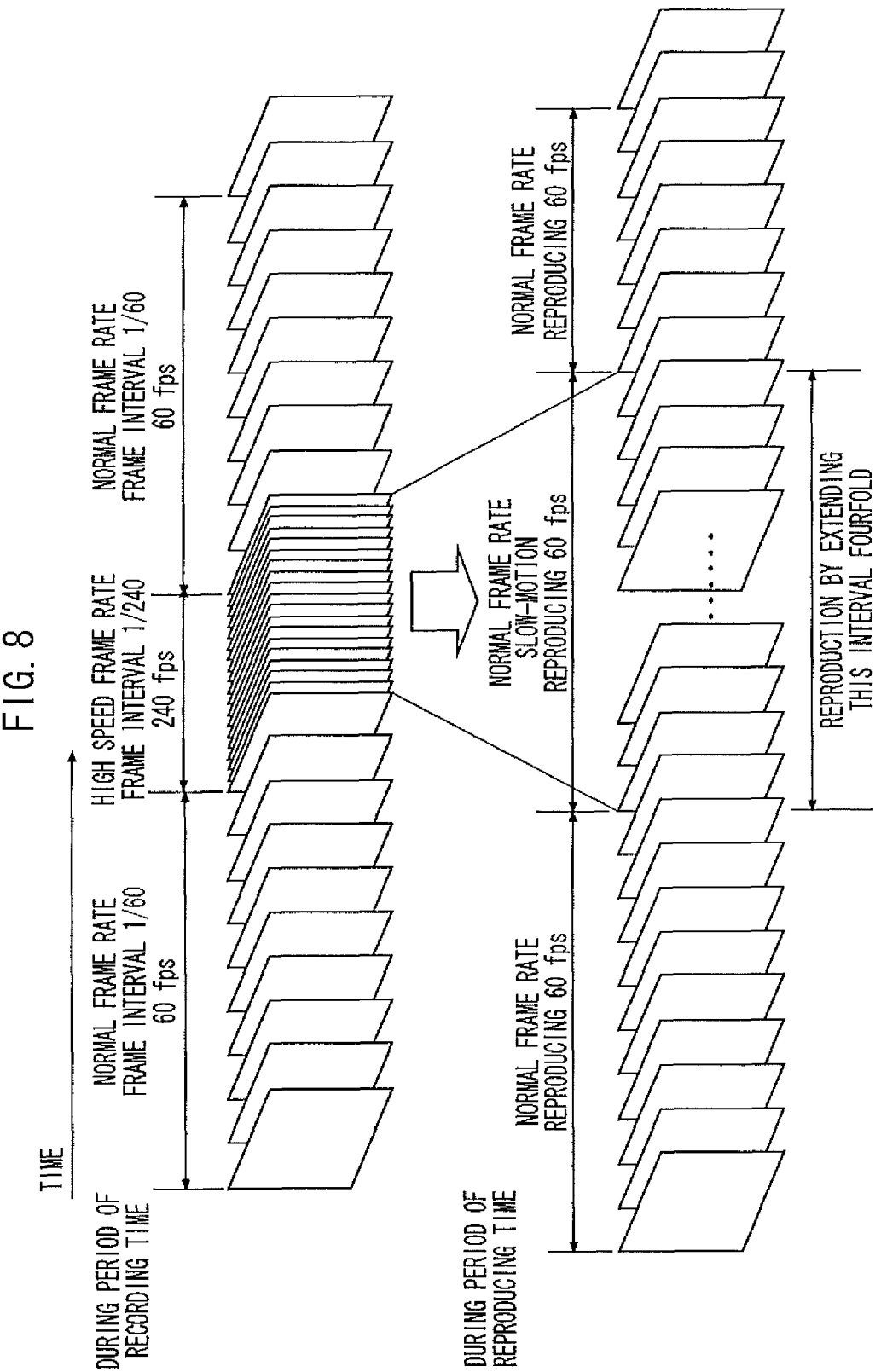
FIG. 8 is a diagram for explaining operation when image signals having the structure of the moving image file are reproduced if the external monitor device does not correspond to the high frame rate.

FIG. 8 shows operation when the image signals with the structure of moving image file shown in FIG. 7 are reproduced while the external monitor device 30 connected to the image output terminal 15 does not correspond to the high speed frame rate.

If the highlight scene is detected by the processing as shown in FIG. 3 while the image pickup operation is performed in the normal mode, the operation mode is automatically switched over from the normal mode to the high speed mode for a period of predetermined time. Accordingly, the image signals obtained by performing the image pickup operation in the normal mode and the image signal obtained by performing the image pickup operation in the high speed mode are recorded in a mixed fashion. Furthermore, since the external monitor device 30 does not correspond to the high speed frame rate, the image signals obtained by performing the image pickup operations in the normal mode and the high speed mode are sequentially output at the normal frame rate when the operation mode is automatically set to the normal frame rate reproducing mode. Therefore, images are displayed on a screen of the external monitor device 30 as images reproduced in slow motion obtained by temporally extending the images picked up in the high speed mode fourfold.

Figure 9:
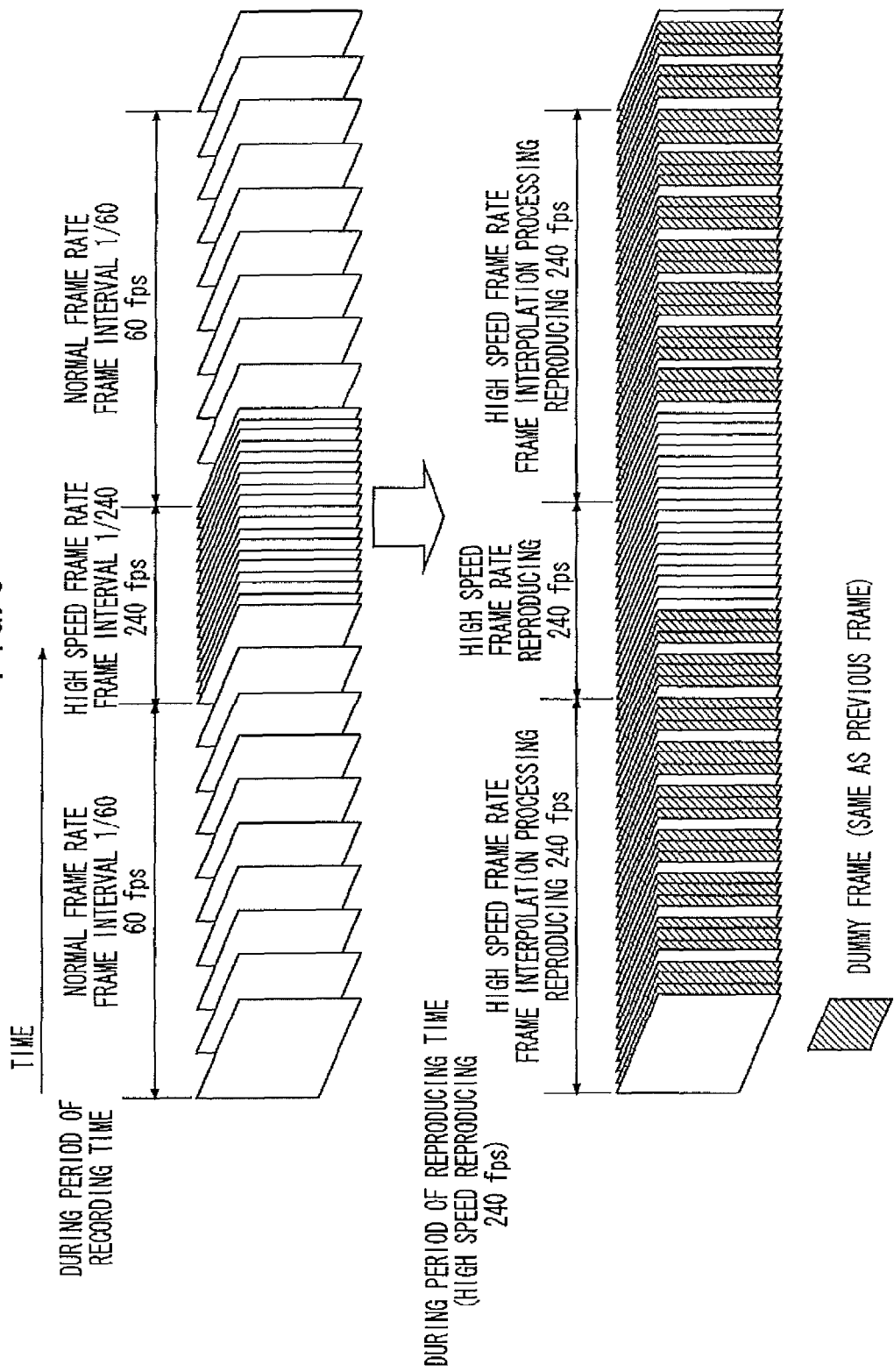
FIG. 9 is a diagram for explaining operation when the image signals having the structure of the moving image file are reproduced if the external monitor device corresponds to the high speed frame rate.

FIG. 9 shows operation when the image signals with the structure of moving image file shown in FIG. 7 are reproduced while the external monitor device 30 connected to the image output terminal 15 corresponds to the high speed frame rate.

If the highlight scene is detected by the processing as shown in FIG. 3 while the image pickup operation is performed in the normal mode, the operation mode is automatically switched over from the normal mode to the high speed mode for a period of predetermined time. Accordingly, the image signals obtained by performing the image pickup operation in the normal mode and the image signals obtained by performing the image pickup operation in the high speed mode are recorded in a mixed fashion. Furthermore, since the external monitor device 30 corresponds to the high speed frame rate, the image signals obtained by performing the image pickup operations in the normal mode and the high speed mode are sequentially output at the high speed frame rate when the operation mode is automatically set to the high speed frame rate reproducing mode. Therefore, images picked up in the high speed mode are displayed on the screen of the external monitor device 30 as the images that are higher in the temporal resolution than the images picked up in the normal mode. Moreover, if the images picked up in the normal mode are output, then a frame interpolation processing is performed to repeatedly insert previous frame as dummy frames, thereby converting it to the image signals at the high speed frame rate to be output.

As stated so far, in the image pickup apparatus according to the present invention, for example, when not performing the zooming operation, based on the preset threshold value, it is then determined whether or not the angular velocity added to this image pickup apparatus is high based on the output from the angular velocity sensor 23. As a result thereof, if the angular velocity detected by the angular velocity sensor 23 is higher than the threshold value, the image pickup operation is performed in the normal mode. If is determined that the angular velocity is lower than the threshold value, then in the image and voice processing ASIC 4, the calculation of the inter-frame difference is performed and the calculation result is compared with the threshold value, so that it is determined whether or not the moving amount of the subject exceeds the predetermined value. As a result thereof, if the moving amount of the subject does not exceed the predetermined value, the image pickup operation is performed in the normal mode. If the moving amount of the subject exceeds the predetermined value, then it is determined that the highlight scene is detected and the image pickup operation is performed in the high speed mode for a period of predetermined time.

As a result thereof, the highlight scene can be detected more reliably and the image pickup operation is performed at the high speed frame rate only when the highlight scene is detected so that the power consumption and the capacity of each storage medium are saved and time and labor required for image pickup frame rate switchover operation are made unnecessary.

In other words, according to the image pickup apparatus according to the present invention, in an image pickup apparatus that is capable of picking up images and recording the picked-up images at the first frame rate and the second frame rate higher than the first frame rate, it is possible to switch over the image-pickup frame rate automatically in a highlight scene that requires images with the high temporal resolution. As a result thereof, it is advantageously possible to attain an image pickup apparatus that can achieve picking up of moving images at the high temporal resolution at appropriate points with less load without costing the power consumption and the capacity of each medium.

Furthermore, by switching over the reproducing frame rate according to the external monitor device 30, a scene picked up at the second frame rate can be reproduced and displayed in slow motion during a period of reproducing time even if the external monitor device 30 does not correspond to the second frame rate, and therefore the images picked up at the second frame rate can be made effective use of. Moreover, a mixture of the images at the first frame rate and the images at the second frame rate can be output at real time to the external monitor device that corresponds to the second frame rate and that can display images at high speed, while keeping high fineness in the temporal direction.

A reproduction control apparatus according to the present invention will next be described. It is to be noted that if the reproduction control apparatus is provided in, for example, the image pickup apparatus, the block diagram of FIG. 1 is also applied to this reproduction control apparatus.

The reproduction control apparatus according to the present invention fixes a frame rate to a high speed frame rate (240 fps) higher than a normal frame rate (60 fps) during a period of recording time and makes the frame rate of output images adjustable according to the frame rate to which an external monitor device that is an output destination corresponds during a period of reproducing time in view of an external monitor device capable of displaying images at the high speed frame rate and an external monitor device that does not correspond to the high speed frame rate, which are possibly present in a mixed fashion transiently.

Consequently, the reproduction control apparatus determines which a reproducing mode when reproducing recorded images is a thinning-out reproducing mode or a non-thinning-out reproducing mode based on the frame rate to which an external monitor device 30 serving as the image output destination corresponds and on auxiliary information on the images recorded to correspond to the images recorded at the high speed frame rate, and controls an image reproducing operation according to the determination result. The system MPU 26 achieves the reproducing mode determination and the reproducing operation control.

As shown in FIG. 1, the image pickup apparatus including this reproduction control apparatus is provided with an imager driving driver 1, an electronic image pickup element 2, an analog front end (AFE) 3, an image and voice processing ASIC (Application Specific Integrated Circuit) 4, a microphone 5, an analog amplifier 6, a speaker 7, a memory 8, a panel driving driver 9, an LCD (Liquid Crystal Display) panel 10, an operating unit 11, a battery 12, a power supply management IC 13, an external recording medium 14, an image output terminal 15, an internal recording medium 21, a programmable RAM (Random Access Memory) 22, an angular velocity sensor 23, a lens driving driver 24, a lens 25 and the system MPU (Micro Processing Unit) 26.

The imager driving driver 1 is a circuit for driving the electronic image pickup element 2. The electronic image pickup element 2 is an image pickup element that is capable of generating not only image signals at the standard frame rate but also image signals at the high speed frame rate. For example, a CMOS (Complementary Metal Oxide Semiconductor) imager or the like is employed as the electronic image pickup element 2.

The AFE 3 is provided with an analog signal processing circuit, an A/D converter and the like. The AFE 3 performs signal processings on an analog image signal generated by the electronic image pickup element 2, for example, a noise reduction processing, a signal level adjustment processing or the like. Furthermore, it converts the image signal that has been subjected to the signal processing into a digital image signal.

The image and voice processing ASIC 4 is an application specific integrated circuit processing an image signal and a voice signal. The image and voice processing ASIC 4 performs processings such as a color processing and a lens correction processing on, for example, the digital image signal obtained by the AFE 3. It also performs a compression processing, an expansion processing and the like on the image signal.

The microphone 5 detects a voice, converts it into an electric signal to be output. The analog amplifier 6 is a circuit that amplifies the electric signal output from the microphone 5.

The speaker 7 converts the electric signal amplified by the analog amplifier 6 into a voice to be output. The memory 8 is a circuit that stores therein various types of data. The panel driving driver 9 is a circuit that drives respective pixels of the LCD panel 10 based on the image signal processed by the image and voice processing ASIC 4. The operating unit 11 is provided with various kinds of operation switches. The battery 12 generates power to be supplied to respective constituent elements of this image pickup apparatus. The power supply management IC 13 is a circuit that detects a state of the battery 12 and a load state and that manages a power supply of this image pickup apparatus.

The external recording medium 14 is an external recording medium for storing therein moving image information, voice image information and the like generated by this image pickup apparatus. The image output terminal 15 is an output terminal for supplying the moving image information generated by this image pickup apparatus or the moving image information recorded in the external recording medium 14 to an external monitor device 30 so that the images can be monitored. The internal recording medium 21 is a storage device included in this image pickup apparatus and stores therein the moving image information, the voice information and the like generated by this image pickup apparatus.

The programmable RAM 22 constitutes various types of logics that are necessary for this image pickup apparatus.

The angular velocity sensor 23 is a sensor for achieving a hand shake prevention function of this image pickup apparatus and detects an angular velocity when the image pickup apparatus moves.

The lens driving driver 24 is a circuit that drives the lens 25 based on a lens driving signal and performing a zooming operation or the like.

The system MPU 26 is a micro processing unit that controls the respective constituent elements of this image pickup apparatus.

Operation will next be described. During a period of recording time of the picked-up images, the system MPU 26 transmits a driving pulse corresponding to the high speed frame rate to the imager driving driver 1 to drive the electronic image pickup element 2 in a high speed mode.

Further, the system MPU 26 also causes the AFE 3 and the image and voice processing ASIC 4 to perform signal processings in the high speed mode and to generate image signals at the high speed frame rate. Moreover, the system MPU 26 causes the image and voice processing ASIC 4 to perform a compression processing on the image signals at the high speed frame rate. The system MPU 26 performs a processing for outputting the image signals at the high speed frame rate thus obtained by controlling the operations performed by the respective constituent elements from the image output terminal 15 and a processing for recording image recording data obtained by compression-processing the image signals at the high speed frame rate into the external recording medium 14 (or into the internal recording medium 21). When recording the image recording data, the voice input from the microphone 5 is digitally sampled, compressed and recorded synchronously with the picked-up images at the high frame rate. Further, the system MPU 26 generates auxiliary information and records it into the external recording medium 14 (or into the internal recording medium 21) with associating the image recording data with a time axis thereof. It is to be noted that image signals that are non-compression-processed image signals at high speed frame rate may be recorded into the external recording medium 14 (or into the internal recording medium 21). It is also to be noted that the image recording data and the image signals at the high speed frame rate recorded in the external recording medium 14 (or internal recording medium 21) are referred to as "moving image information".

Figure 10:
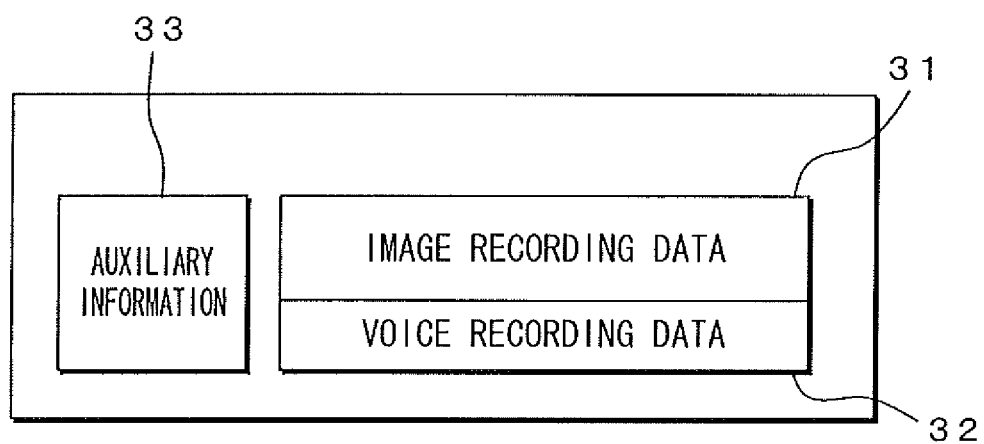
FIG. 10 is a diagram showing a configuration of data recorded in an external recording medium (or in an internal recording medium).

FIG. 10 shows a configuration of data recorded into the external recording medium 14 (or into the internal recording medium 21). As shown in FIG. 10, auxiliary information 33 is recorded separately from image recording data 31 and voice recording data 32 herein. It is to be noted that in an example shown in FIG. 10, the auxiliary information is provided for each file unit, but as stated above, an auxiliary information recording format is not limited to this.

It is assumed that the auxiliary information 33 includes a date, frame rate switchover information (a flag), and image pickup situations, such as a zooming operation situation and the angular velocity detected by the angular velocity sensor 23, at the time that the image signals at the high speed frame rate are generated to be used to generate the frame rate switchover information. It is to be noted that a user can change the frame rate switchover information (flag) in the auxiliary information 33 arbitrarily during a period of recording or reproducing time.

If the external monitor device 30 connected to the image output terminal 15 can correspond to the high speed frame rate, images can be displayed based on the moving image information output from the image output terminal 15. However, if the external monitor device 30 does not correspond to the high speed frame rate, for example, if the external monitor device 30 is an LCD panel or the like included in a conventional television apparatus or equipment, the images cannot be displayed based on the moving image information output from the image output terminal 15 when the frame rate of the image signals output from the image output terminal 15 is the high speed frame rate.

Therefore, as a function for the external device that does not correspond to the high frame rate, a normal frame rate thinning-out reproducing mode is provided for thinning out frames, converting a frame rate of moving image information to be reproduced into the normal frame rate to which the external monitor device 30 corresponds and outputting it if the moving image information recorded in the external recording medium 14 (or in the internal recording medium 21) is reproduced and the frame rate of the moving image information to be reproduced is the high speed frame rate. For example, the normal frame rate thinning-out reproducing mode is provided for performing reproduction in which 240 frame images per second (240 fps) are thinned-out to 60 frame images per second (60 fps). By doing so, reproduced images can be displayed based on the high speed frame rate moving image information even if the external monitor device that does not correspond to the high speed frame rate is employed. Furthermore, a normal frame rate non-thinning-out reproducing mode is provided for outputting the high speed frame rate moving image information at the normal frame rate to which the external monitor device 30 corresponds without thinning out the frames of the moving image information.

FIG. 11 show reproducing operations when such an external monitor device that does not correspond to the high speed frame rate is connected. FIG. 11($a$) shows a reproducing operation in the normal frame rate thinning-out reproducing mode and the moving image information to be reproduced has a high frame rate and frame numbers [0, 1, 2, 3, 4, 5, 6, 7, 8 . . . ] are allocated at intervals of 1/240 second. If this moving image information is reproduced in the normal frame rate thinning-out reproducing mode, then frames are thinned out and frame images of given frame numbers [0, 4, 8, 12 . . . ] at intervals of 1/60 second are output.

FIG. 11(b) shows a reproducing operation in the normal frame rate non-thinning-out reproducing mode. If the moving image information at the high frame rate is reproduced in the normal frame rate non-thinning-out reproducing mode, the moving image information is output at the normal frame rate to which the external monitor device 30 corresponds without thinning out frames. That is, frame images of given frame numbers [0, 1, 2, 3, 4, 5, 6, 7, 8 . . . ] are output at intervals of 1/60 second.

Figure 12:
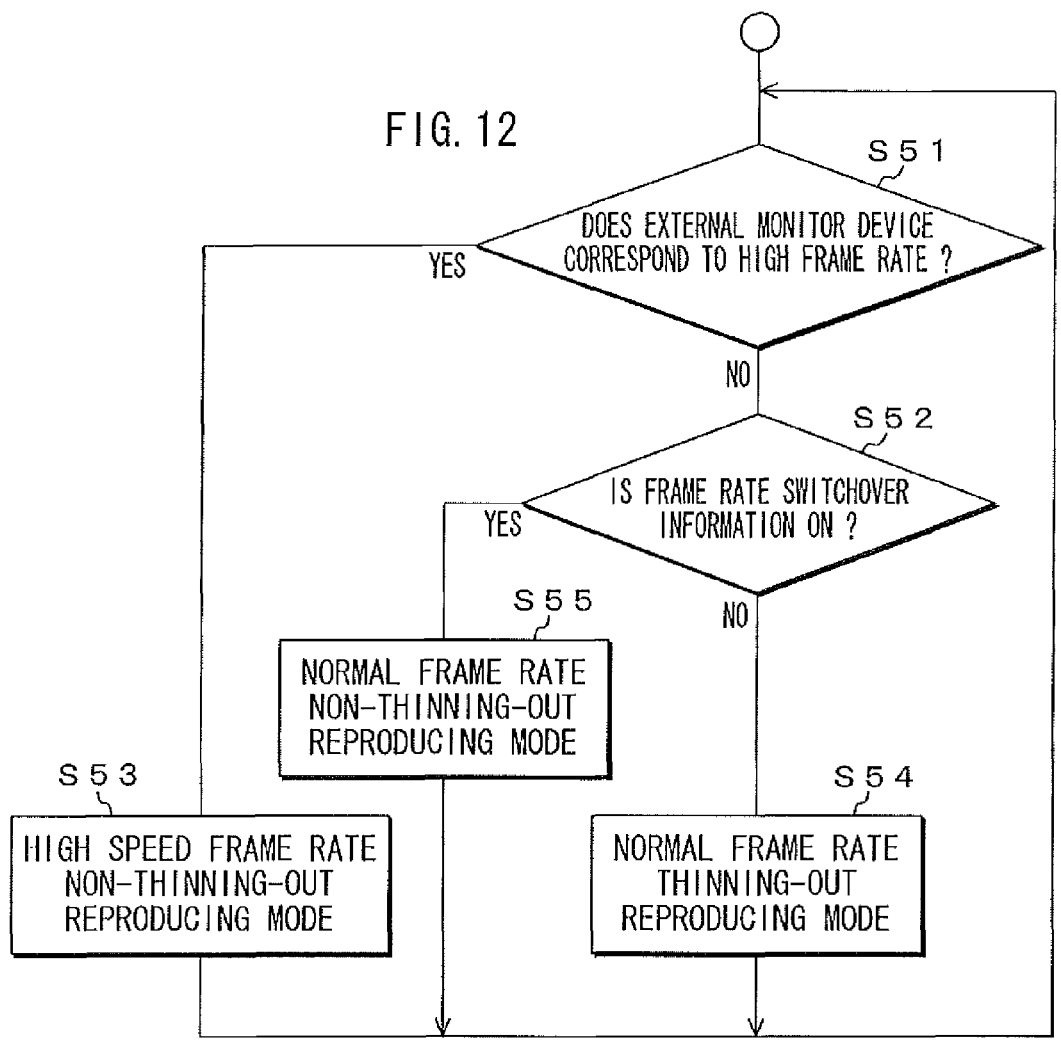
FIG. 12 is a flowchart showing a frame rate selection operation by manual operation during a period of reproducing time.

FIG. 12 is a flowchart showing a frame rate selection operation by manual operation during a period of reproducing time depending on whether or not the output destination is the external monitor device that corresponds to the high speed frame rate.

As shown in the flowchart of FIG. 12, the system MPU 26 determines whether or not the external monitor device 30 serving as the output destination corresponds to the high speed frame rate (step S51). If the user's manual operation indicates that the output destination is the external monitor device that corresponds to the high speed frame rate, the system MPU 26 controls the image and voice processing ASIC 4 to output images in the high speed frame rate non-thinning-out reproducing mode (step S53). In the high speed frame rate non-thinning-out reproducing mode, the moving image information at the high speed frame rate (240 fps) recorded in the external recording medium 14 (or in the internal recording medium 21) is output without changing the frame rate.

If it is the external monitor device that does not correspond to the high speed frame rate, the system MPU 26 selects the normal frame rate thinning-out reproducing mode when the frame rate switchover information (flag) set by manual operation is off (step S54) depending on to whether the frame rate switchover information is on or off (step S52). The normal frame rate thinning-out reproducing mode is a reproducing mode for causing the image and voice processing ASIC 4 to thin out frames to output moving image information at the high speed frame rate (240 fps) as moving image information at the normal frame rate (60 fps) to which the external monitor device corresponds when reproducing the moving image information recorded in the external recording medium 14 (or in the internal recording medium 21). Further, the system MPU 26 selects the normal frame rate non-thinning-out reproducing mode when the frame rate switchover information is on (step S55). The normal frame rate non-thinning-out reproducing mode is a mode for outputting at the normal frame rate (60 fps) the moving image information at the high speed frame rate (240 fps) when reproducing the moving image information recorded in the external recording medium 14 (or internal recording medium 21). For example, it is a reproducing mode for outputting the images (240 images) for one second as slow-motion images for four seconds that are four times as long as the image pickup time, thereby performing slow reproducing at a high temporal resolution.

Moreover, the reproduction control apparatus not only manually switches over the frame rate but also automatically switches over the normal frame rate thinning-out reproducing mode to/from the normal frame rate non-thinning-out reproducing mode based on the frame rate switchover information included in the auxiliary information. By doing so, for example, the reproduced images, for a desired period of time, can be automatically displayed as slow-motion images at the high temporal resolution. In this case, the reproducing mode is determined by reproducing the auxiliary information recorded in the external recording medium 14 (or in the internal recording medium 21), and the moving image information associated with the auxiliary information used for this determination is reproduced in the determined reproducing mode.

Figure 13:
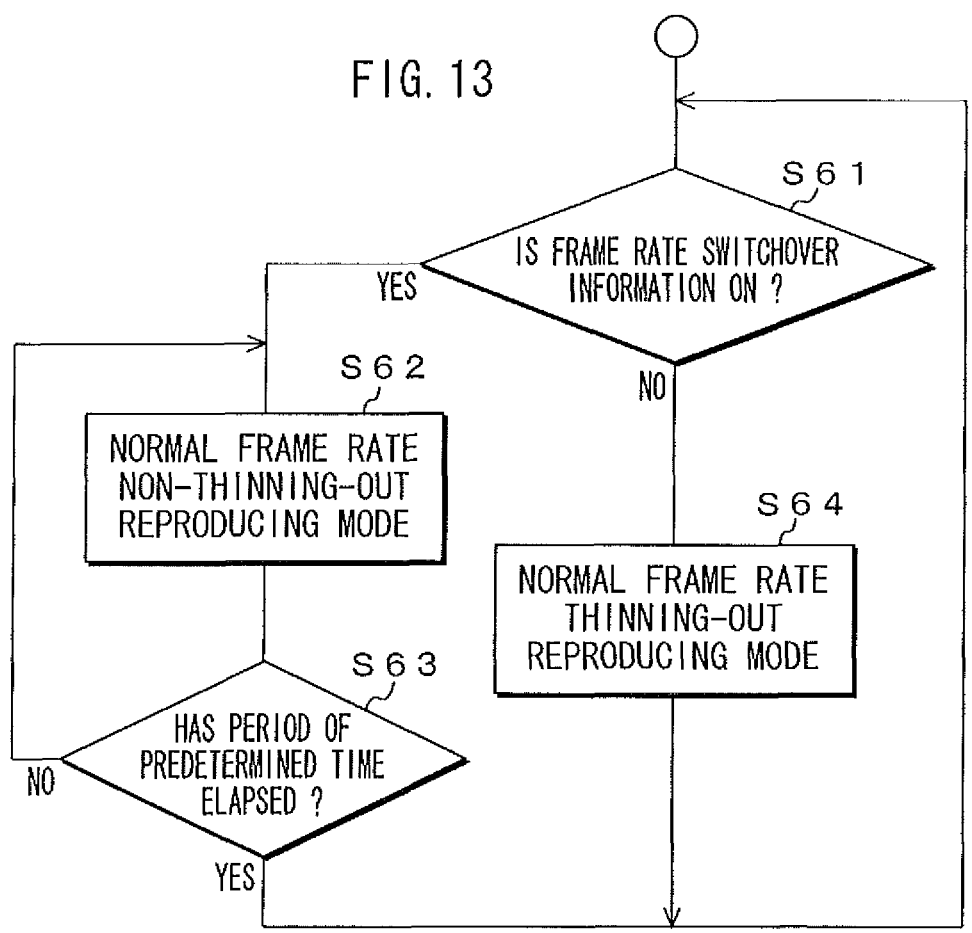
FIG. 13 is a flowchart showing an automatic switchover operation between a normal frame rate thinning-out reproducing mode and a normal frame rate non-thinning-out reproducing mode.

FIG. 13 is a flowchart showing an operation for automatically switching over the normal frame rate thinning-out reproducing mode to/from the normal frame rate non-thinning-out reproducing mode based on the frame switchover information included in the auxiliary information 33.

The system MPU 26 determine, at the same time of reproducing the image recording data, whether or not the frame rate switchover information in the auxiliary information associated with the image recording data to be reproduced is on (step S61) and then, if the frame rate switchover information is on, the normal frame rate non-thinning-out reproducing mode is set (step S62). Thereafter, the system MPU 26 determines whether or not a period of predetermined time has elapsed in the reproduction in the normal frame rate non-thinning-out reproducing mode (step S63) and then, if the period of predetermined time has not elapsed, reproduction in the normal frame rate non-thinning-out reproducing mode is continued but if the period of predetermined time has elapsed, the process returns to the step S61. If the frame rate switchover information is not on, the system MPU 26 sets the normal frame rate thinning-out reproducing mode (step S64).

Alternatively, the reproduction control apparatus can generate the frame rate switchover information using information, which is included in the auxiliary information 33, indicating a zooming operation when the image pickup apparatus generates the moving image information at the high speed frame rate and/or showing an angular velocity that indicates a moving amount of the image pickup apparatus, and can switch over the reproducing mode automatically based on the generated frame rate switchover information.

Figure 14:
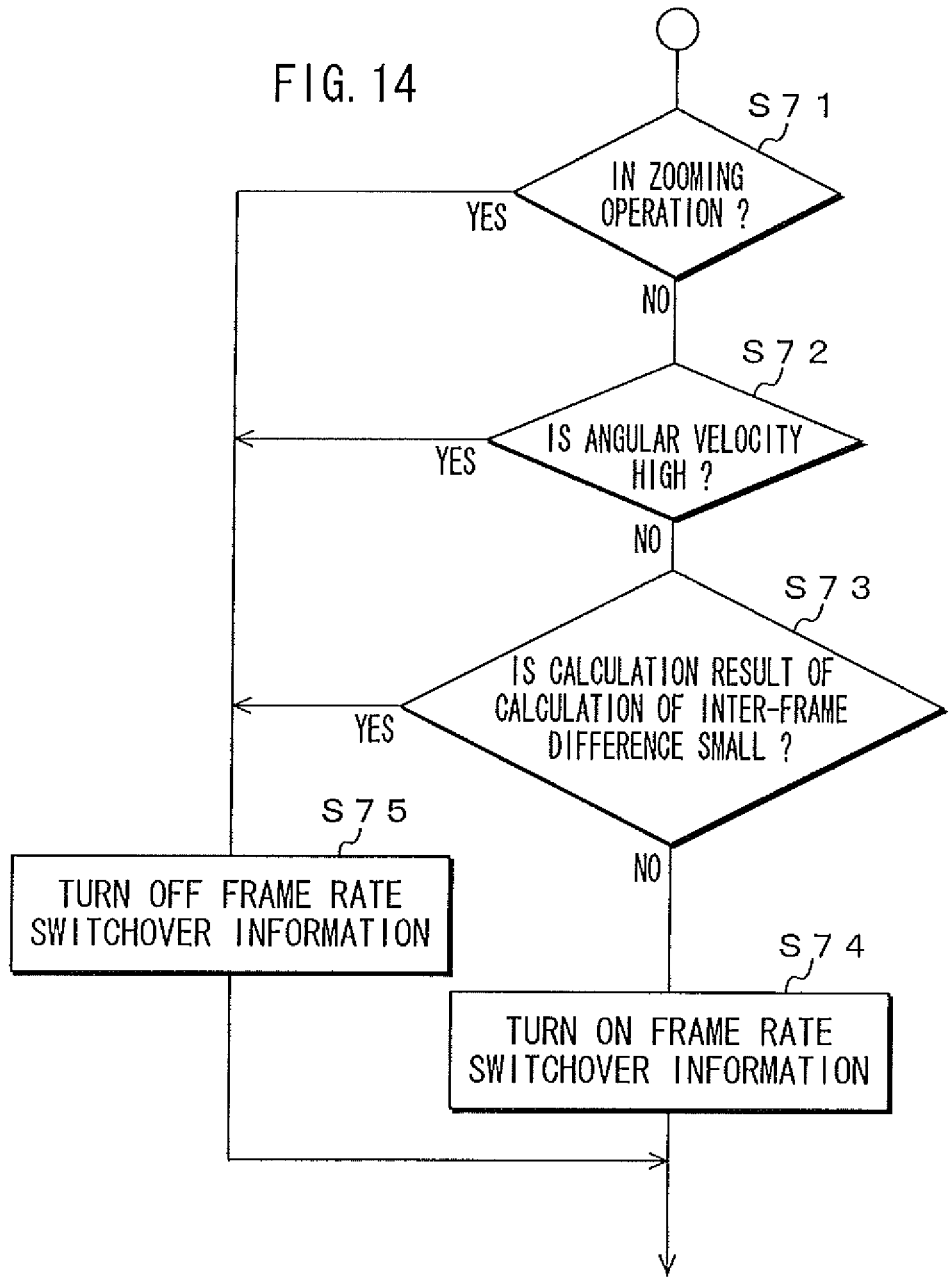
FIG. 14 is a flowchart showing an automatic generation operation of the frame rate switchover information.

FIG. 14 is a flowchart showing an automatic generation operation of the frame rate switchover information.

As shown in the flowchart of FIG. 14, the system MPU 26 determines whether or not the zooming operation (step S71) is performing. If the zooming operation is performing, the system MPU 26 does not instruct the frame rate switchover and turns off the frame rate switchover information (step S75).

If at the step S71, the zooming operation (step S71) is not performing, the system MPU 26 next determines whether or not an angular velocity is high by comparison with, for example, a preset threshold value (step S72). As a result thereof, if the angular velocity is higher than the threshold value, the system MPU 26 does not instruct the frame rate switchover (step S75).

If it is determined in the step S72 that the angular velocity is not higher than the threshold value, the system MPU 26 next calculates an inter-frame difference using the reproduced moving image information at the high frame rate and determines whether or not a calculation result is smaller than a threshold value (step S73). As a result thereof, if the calculation result is smaller than the threshold value, the system. MPU 26 does not instruct the frame rate switchover (step S75).

If it is determined in the step S73 that the calculation result is not smaller than the threshold value, the system MPU 26 determines that the frame rate is switched over and turns on the frame rate switchover information (step S74). It is to be noted that as for the frame rate switchover information, the frame rate switchover information is turned on in a pulsed fashion so as to indicate a frame rate switchover timing, thereby performing the switchover to the normal frame rate non-thinning-out reproducing mode so as to subsequently perform the reproduction at the normal frame rate non-thinning-out reproducing mode for a period of predetermined time.

Furthermore, the system MPU 26 may generate the frame rate switchover information by using not only the auxiliary information but also the reproduced voice signal. For example, if a signal level of the voice signal from the microphone exceeds a threshold value, an instruction of the frame rate switchover is performed.

In this manner, if the frame rate switchover information is generated, then the normal frame rate non-thinning-out reproducing mode is selected and the highlight scene in which the moving amount of the subject increases can be displayed as slow-motion images at a high temporal resolution when the moving amount of the subject exceeds the predetermined value. Further, even if the moving amount of the subject increases by performing the zooming operation or changing an image pickup direction, the frame rate switchover is not performed in this case, so that it is possible to prevent the switchover to the normal frame rate non-thinning-out reproducing mode when the moving amount of the subject is not large.

Moreover, by switching over the frame rate based on the voice signal, it is possible to display, for example, a start scene in a race scene at an athletic meeting as slow-motion images at the high temporal resolution.

As stated so far, this reproduction control apparatus has the high speed frame rate non-thinning-out reproducing mode for outputting the moving image information at the high speed frame rate without changing the frame rate if the external monitor device that corresponds to the high speed frame rate is employed during a period of reproducing time. It also has the normal frame rate thinning-out reproducing mode for causing the image and voice processing ASIC 4 to thin out the moving image information at the high speed frame rate and for performing the reproduction as the moving image information at the frame rate to which the external monitor device corresponds if the external monitor device that does not correspond to the high speed frame rate is employed during a period of reproducing time. Further, it has the normal frame rate non-thinning-out reproducing mode for sequentially outputting the moving image information at the high speed frame rate at the frame rate to which the external monitor device corresponds, thereby performing the reproduction for a period of longer time than a period of the image pickup time. As a result thereof, if the external monitor device that corresponds to the high speed frame rate is employed, the moving image information at the high speed frame rate can be reproduced without causing a reduction in the temporal resolution or the like. Furthermore, if the external monitor device that does not correspond to the high speed frame rate is employed, then the moving image information at the high speed frame rate is output at the frame rate to which the external monitor device corresponds and the highlight scene can be automatically displayed in slow motion. Thus, an image source at the high speed frame rate can be effectively used. Moreover, by thinning out frames of the moving image information at the high speed frame rate, the external monitor device can display images without changing a moving velocity of the subject.

Moreover, if the instruction of the frame rate switchover is performed manually, time and labor for selecting the slow-motion reproduction are required. However, by using the auxiliary information, the frame rate can be automatically switched over. For example, the highlight scene can be easily displayed as slow-motion images at the high temporal resolution.

INDUSTRIAL APPLICABILITY

It is preferable when an external monitor device that does not correspond to a high speed frame rate as an image display side is used if moving images are recorded or reproduced.

The invention claimed is:

1. An image pickup apparatus comprising:
an imager which is capable of picking up an image at a first frame rate and a second frame rate that is higher than the first frame rate;
a micro processing unit that detects a zooming operation and a highlight scene; and
an imager driving driver that switches over a frame rate of the imager in response to detection of the highlight scene by the micro processing unit,
wherein the micro processing unit is configured to not detect the highlight scene when a zooming operation is detected during recording of the image.

2. The image pickup apparatus according to claim 1, wherein the imager driving driver switches over the frame rate of the imager from the first frame rate to the second frame rate in response to the detection of the highlight scene by the micro processing unit.

3. The image pickup apparatus according to claim 2, wherein the imager driving driver switches the frame rate of the imager from the second frame rate to the first frame rate after a period of predetermined time is elapsed since the frame rate of the imager is switched from the first frame rate to the second frame rate.

4. The image pickup apparatus according to claim 3, wherein the micro processing unit detects the highlight scene when a movement of a subject exceeds a predetermined value.

5. The image pickup apparatus according to claim 4, further comprising a lens driving driver and/or angular velocity sensor for detecting an angular velocity when the image pickup apparatus moves,
wherein the micro processing unit calculates the movement of the subject by performing an inter-frame difference calculation when the lens driving driver is not in a zooming operation and/or the angular velocity detected by the angular velocity sensor does not exceed a predetermined value.

6. The image pickup apparatus according to claim 1, wherein the first frame rate is a frame rate of standard television system.

7. An image pickup method comprising:
using an imager to pick up an image at a frame rate;
detecting a zooming operation and a highlight scene;
outputting a highlight scene detection result; and
changing the frame rate of the imager in response to a highlight scene detection result indicating detection of a highlight scene,
wherein the highlight scene is not detected when a zooming operation is detected during recording of the image.

8. A non-transitory computer-readable medium having stored thereon a computer-readable program for implementing an image pickup method, the image pickup method comprising:
using an imager to pick up an image at a frame rate;
detecting a zooming operation and a highlight scene;
outputting a highlight scene detection result; and
changing the frame rate of the imager in response to a highlight scene detection result indicating detection of a highlight scene,
wherein the highlight scene is not detected when a zooming operation is detected during recording of the image.

* * * * *